(12) United States Patent
Paluszek et al.

(10) Patent No.: US 8,311,679 B2
(45) Date of Patent: Nov. 13, 2012

(54) MATRIX CONVERTERS FOR WIND ENERGY CONVERSION SYSTEMS

(76) Inventors: Michael A. Paluszek, Princeton, NJ (US); Pradeep Bhatta, Plainsboro, NJ (US)

( * ) Notice: Subject to any disclaimer, the term of this patent is extended or adjusted under 35 U.S.C. 154(b) by 506 days.

(21) Appl. No.: 12/427,338

(22) Filed: Apr. 21, 2009

(65) Prior Publication Data

US 2009/0265040 A1   Oct. 22, 2009

Related U.S. Application Data

(60) Provisional application No. 61/046,529, filed on Apr. 21, 2008.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| F03D 9/00 | (2006.01) |
| H02P 9/04 | (2006.01) |

(52) U.S. Cl. ............................. 700/287; 290/44; 290/55
(58) Field of Classification Search .................. 700/286, 700/287, 289, 290; 290/7, 43, 44, 54, 55; 363/1, 8, 13, 34, 37, 39, 40, 157, 159, 165, 363/177
See application file for complete search history.

(56) References Cited

U.S. PATENT DOCUMENTS

| | | | | |
|---|---|---|---|---|
| 5,083,039 | A | * | 1/1992 | Richardson et al. ............ 290/44 |
| 5,225,712 | A | * | 7/1993 | Erdman .......................... 290/44 |
| 5,594,636 | A | | 1/1997 | Schauder |
| 5,949,672 | A | | 9/1999 | Bernet |
| 6,496,343 | B2 | | 12/2002 | Mahlein et al. |
| 6,519,170 | B2 | | 2/2003 | Lacaze et al. |
| 6,566,764 | B2 | | 5/2003 | Rebsdorf et al. |
| 6,603,647 | B2 | | 8/2003 | Briesen et al. |
| 6,826,065 | B2 | | 11/2004 | Chekhet et al. |
| 6,900,998 | B2 | * | 5/2005 | Erickson et al. .............. 363/159 |
| 7,352,076 | B1 | * | 4/2008 | Gabrys ........................... 290/44 |
| 7,576,443 | B2 | * | 8/2009 | Raju ............................... 290/44 |
| 7,659,637 | B2 | * | 2/2010 | Ichinose et al. ................. 290/55 |
| 7,994,658 | B2 | * | 8/2011 | Cardinal et al. ................ 307/84 |
| 8,084,874 | B2 | * | 12/2011 | Llorente Gonzalez ......... 290/44 |
| 8,183,704 | B2 | * | 5/2012 | Rivas et al. ..................... 290/44 |
| 8,193,657 | B2 | * | 6/2012 | Paluszek et al. ............... 290/55 |
| 8,207,623 | B2 | * | 6/2012 | Rivas et al. ..................... 290/44 |
| 2010/0150718 | A1 | * | 6/2010 | Freda ............................. 416/120 |
| 2011/0187109 | A1 | * | 8/2011 | Ichinose et al. ................. 290/44 |

OTHER PUBLICATIONS

Jovanovic et al., "Sensorless Speed Control Strategy for Brushless Doubly-Fed Reluctance Machines", IEEE International on Electric Machines & Drives Conference, 2007, vol. 2, pp. 1514-1519.*
Satish et al, "Speed Sensor-less Direct Power Control of a Matrix Converter Fed Induction Generator for Variable Speed Wind Turbines", International Conference on Power Electronics, Drives and Energy Systems, 2006, pp. 1-6.*

* cited by examiner

*Primary Examiner* — Crystal J Barnes-Bullock
(74) *Attorney, Agent, or Firm* — Fox Rothschild LLP; Richard C. Woodbridge; Perry M. Fonseca

(57) ABSTRACT

The invention is an efficient matrix converter for wind energy conversion systems (WECS) using permanent magnet DC generators, incorporating control algorithms integrated with rotor aerodynamics, generator dynamics and the wind environment. Using a complete model of the system enables the design of an integrated control scheme for the WECS that improves the overall system efficiency. Estimates of wind velocity and rotor speed measurements are fed forward to the matrix converter subsystem for efficient switching.

1 Claim, 3 Drawing Sheets

MATRIX CONVERTERS FOR WIND ENERGY CONVERSION SYSTEMS

CROSS REFERENCE TO RELATED APPLICATIONS

This application is related to, and claims priority from, U.S. provisional application 61/046,529, filed Apr. 21, 2008 by Michael A. Paluszek and Pradeep Bhatta entitled "MATRIX CONVERTERS FOR WIND ENERGY CONVERSION SYSTEMS", the contents of which are hereby incorporated by reference.

FIELD OF THE INVENTION

The present invention generally relates to matrix converters used in wind energy conversion systems and, more specifically, to matrix converters designed specifically for interfacing wind energy conversion systems to a power grid or a single-phase AC load.

BACKGROUND OF THE INVENTION

Wind energy is a vast resource that can be tapped in a distributed manner. Economically viable wind energy technology depends on having good power extraction efficiency in all subsystems of the wind energy conversion system (WECS).

The power conversion stage is an important source of efficiency losses in a WECS and also contributes significantly to system size and cost. A reasonable trade off between efficiency, costs and size can be achieved by using a matrix converter. The matrix converter is a forced commutated converter, which uses an array of controlled bidirectional switches as the main power elements to create a variable output voltage with unrestricted frequency. It does not have a dc-link circuit, and no large energy storage elements.

Methods for converting alternating current (AC) power from one frequency to another can be broadly classified into (i) indirect methods and (ii) direct methods.

Indirect methods include two or more stages of conversion and an intermediary direct current (DC) link. For example, a diode rectifier can be used to convert AC power to a DC power. Alternatively, a pulse width modulation (PWM)-controlled rectifier can be used to enable bidirectional power flow. The rectification is realized in conjunction with a DC-link capacitor. A voltage source inverter converts DC back to AC with variable frequency and amplitude.

Direct methods involve an array of static power switches connected directly between the input and output terminals. The basic operating principle is to piece together an output voltage waveform with the desired fundamental component from selected segments of the input voltage waveforms. The most common form of direct method-based converters are the cycloconverters. In general there are two types of cycloconverters: (i) naturally commutated and (ii) forced commutated. Naturally commutated cycloconverters use thyristors that are switched naturally by voltage levels of the AC supply. A forced commutated cycloconverter, such as the matrix converter, uses switches that operate independently of the source and load voltages. They require auxiliary commutating circuits.

A matrix converter interfaced with a variable-speed wind turbine incorporating a doubly-fed induction generator is described in U.S. Pat. No. 6,566,764 issued May 20, 2003 to Rebsdorf and Halle. A protection circuit is used for protecting the circuit from over voltages, and retains control of the matrix converter after grid disruption. This system only applies to induction generators that are not suitable for all wind power applications. In addition it does not integrate rotor and generator control. Further it is not designed for permanent magnet generators that are more efficient and particularly well-suited for small wind turbines.

A three-phase matrix converter for converting AC voltages of predetermined amplitude and frequency into AC voltages of any amplitude and frequency and a method for operating the same, using bidirectional switches is described in U.S. Pat. No. 5,949,672 issued Sep. 7, 1999 to Bernet.

U.S. Pat. No. 6,826,065 issued Nov. 30, 2004 to Cheket, et al. describes a method of commutation of current by bi-directional switches for matrix converters with at least three input phases. A matrix converter that allows for completely natural commutation between phases is presented in U.S. Pat. No. 6,519,170 issued Feb. 11, 2003 to Lacaze et al. Alternative commutation methods are described in U.S. Pat. No. 5,594,636 issued Jan. 14, 1997 to Schauder and U.S. Pat. No. 5,949,672 issued Sep. 7, 1999 to Bernet. Short circuit currents through the switches and overvoltages on circuit elements are important concerns in a matrix converter system. U.S. Pat. No. 6,603,647 issued Aug. 5, 2003 to Briesen, et al. describes a method for controlling freewheeling paths in a matrix converter. U.S. Pat. No. 6,496,343 issued Dec. 17, 2002 to Mahlein, et al. presents an overvoltage protection apparatus for a matrix converter.

The preceding seven patents only addressed control of the matrix converter and not the integrated control of the converter with other elements in a system. Thus, there is a need for a WECS using a matrix converter which integrates control of the converter with other elements of the WECS.

SUMMARY OF THE INVENTION

An aspect of the present invention provides a wind energy conversion system (WECS) using a permanent magnet generator. The WECS includes a wind turbine including a plurality of rotor blades and a shaft, in connection with a transmission and a generator. The generator is further connected with a matrix converter, which, in turn is connected to a power grid. The WECS also includes a controller operatively connected to the transmission, rotor blades, shaft, generator, matrix converter, and one or more sensors. In operation, the controller inputs information from its one or more sensors and controls the rotor blades, transmission, generator, and matrix converter to optimize the efficiency of wind energy conversion by the WECS. The sensors may optionally include an estimator for wind speed and a tachometer for determining rotor blade torque.

Also provided is a matrix converter that includes an array of controlled semiconductor switches, each of which include two anti-paralleled NPT-IGBTs with reverse blocking capability, and the matrix converter further includes a clamp circuit for overcurrent/overvoltage protection.

A method of controlling a wind energy conversion system (WECS) is also provided. The method includes an integrated control scheme repeating the following steps of inputting, by a controller, data comprising the actual wind velocity measured by a wind sensor, the actual speed of a rotor as measured by a tachometer, rotor torque, generator speed, generator torque, effective gear feedback torque felt by the rotor, generator-side emf and current, grid-side emf and current, control gear ratio and calculation, by the controller, of switching function control input to the matrix converter and control generator terminal voltage for optimizing the efficiency of wind energy conversion by the WECS.

The invention pertains to integrating the switching control of a matrix converter with control of other modules of wind energy conversion system (WECS), thereby improving the overall efficiency of the system. Integrated control is achieved based on a complete model of the system comprising rotor aerodynamics, generator dynamics, and the wind environment. Estimates of wind velocity and rotor speed measurements are fed forward to the matrix converter module.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The present invention advantageously provides for a WECS having a matrix converter suitable for all wind power applications. The WECS also provides for a matrix converter that integrates rotor and generator control, and is designed for permanent magnet generators that are more efficient and particularly well-suited for small wind turbines.

During the course of this description like numbers will be used to identify like elements according to the different views, which illustrate the invention.

Figure 1:
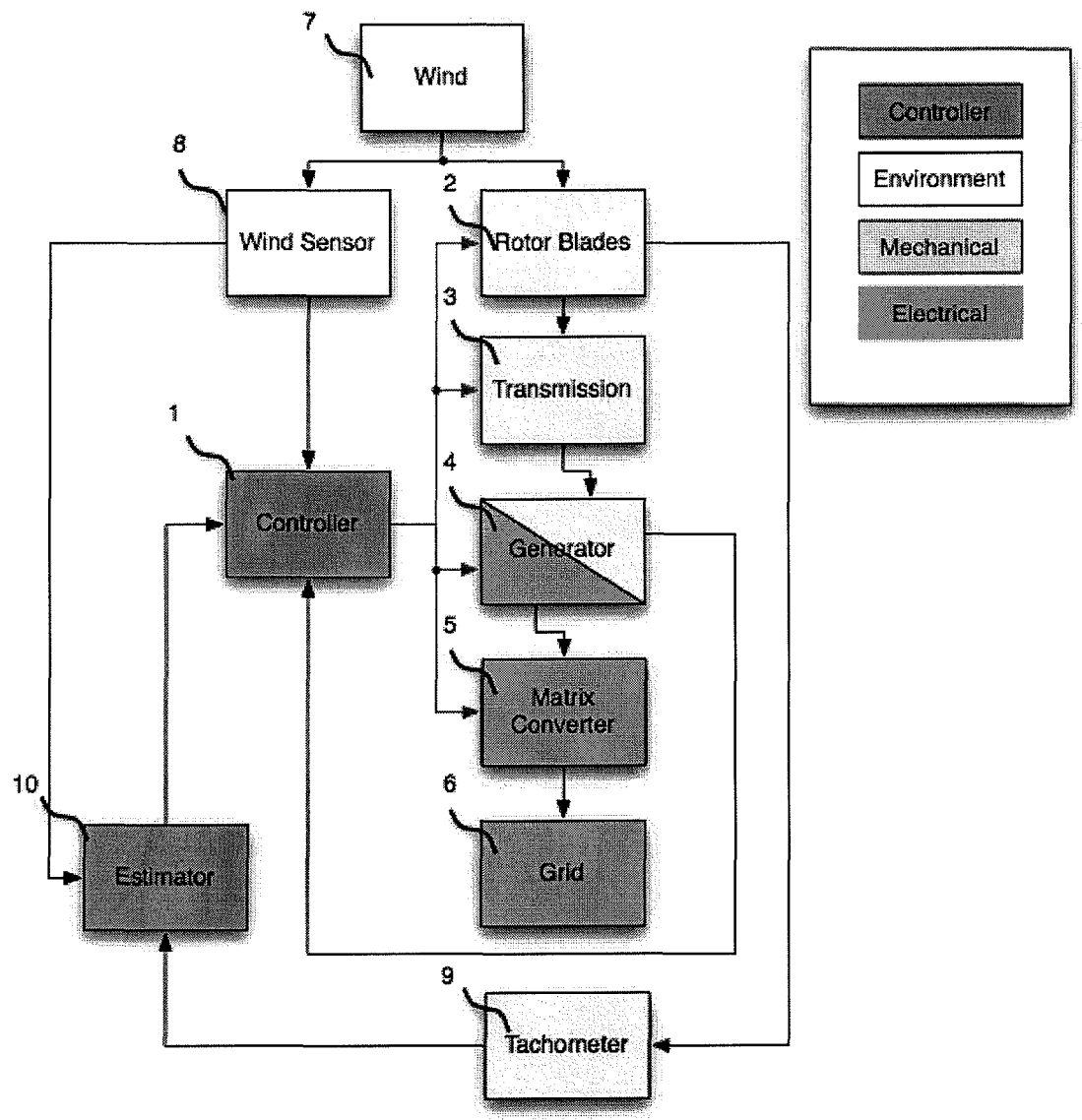
FIG. 1 is a block diagram illustrating an exemplary system, in accordance with an embodiment of the present invention in accordance with an embodiment of the present invention.

An embodiment of the invention is shown in FIG. 1. This block diagram shows various components of the wind energy conversion system with a matrix converter for interfacing with the grid. The ambient wind 7 provides the energy input to the system. The controller 1 gets measurements from the generator 4, and the wind sensor 8. Controller 1 then computes control signals for the blade assembly actuation 2, the transmission system 3, the generator 4 and the matrix converter 5. The matrix converter 5 interfaces between a possibly varying frequency voltage at the terminals of the generator 4 to a constant frequency output for the output load or the utility grid 6. The estimator 10 operates in communication with tachometer 9, wind sensor 8, and controller 1, by inputting wind velocity 14 and rotor speed 18 and forwarding wind velocity estimate 44 and rotor torque 46 to the controller 1.

Figure 2:
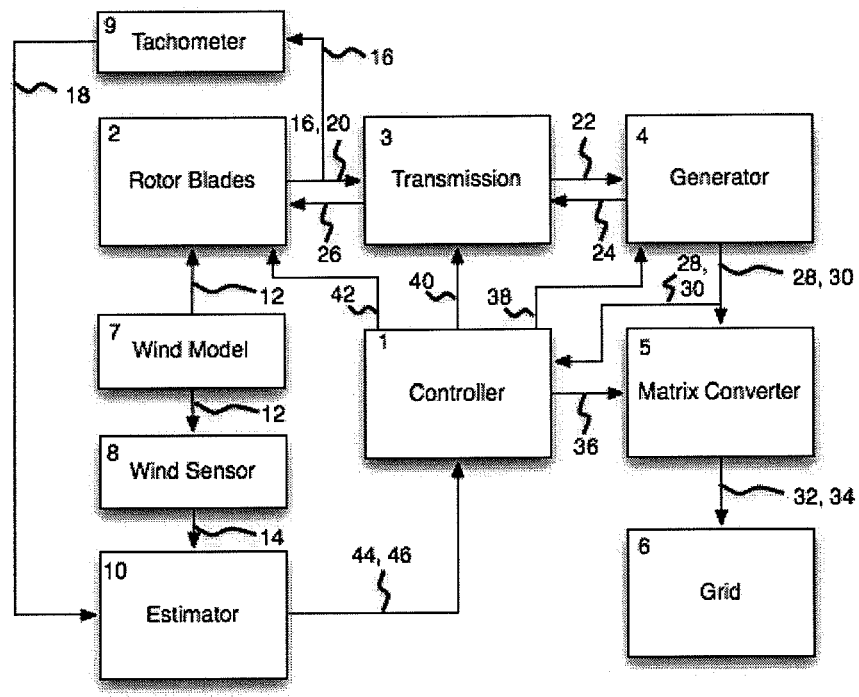
FIG. 2 shows a block diagram indicating the state flow in the integrated control system in accordance with an embodiment of the present invention.

FIG. 2 is a block diagram depicting the state flow in an exemplary integrated control system configuration. WECS components in this diagram include the controller 1, rotor blades 2, transmission system 3, generator 4, matrix converter 5, power grid 6, wind modeler 7, wind sensor 8 tachometer 9 and estimator 10.

The data/information transmitted in an embodiment of the invention as depicted in FIG. 2 includes: the estimated wind velocity 12, the actual wind velocity measured by the wind sensor 14, the actual rotor speed 16, and the rotor speed 18 is measured by the tachometer are depicted. Also depicted are the rotor torque 20, the generator speed 22, the generator torque 24, the effective gear feedback torque 26 felt by the rotor, the generator-side emf 28 and current 30, expressed either in the d-q frame or the abc frame, the grid-side emf 32 and current 34 respectively, also expressed either in the d-q frame or the abc frame, the switching function control input 36 to the matrix converter, a control input 38 to the generator—such as the rotor winding circuit driving current, the control gear ratio 40, the blade control actuation 42 (possibly for changing the blade pitch or camber), the wind velocity estimate and future expected value 44, and an estimate of the rotor torque 46.

Figure 3:
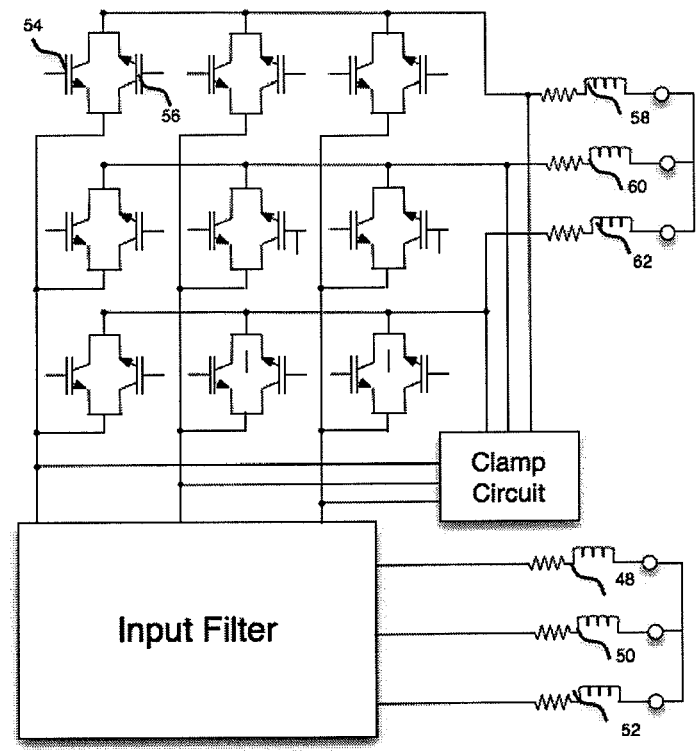
FIG. 3 shows a realization of the matrix converter system in accordance with an embodiment of the present invention.

FIG. 3 is a circuit diagram depicting details of an exemplary matrix converter assembly. In accordance with an embodiment of the present invention, the matrix converter is an array of controlled semiconductor switches that can be used to convert variable frequency generator terminal voltage to a constant frequency grid or load voltage. The matrix converter does not have any dc-link circuit and does not need any large energy storage elements. Three phase coils 48, 50, 52, in the generator are depicted. Two anti-paralleled NPT-IGBTs with reverse blocking capability 54, 56, which form a semiconductor bidirectional switch are also depicted. A clamp circuit is provided for overcurrent/overvoltage protection. Grid or load three phase coils 58, 60, 62 are depicted. Each semiconductor bidirectional switch is operated at a high enough switching frequency. The switches are turned on and off such that at any instant each input phase is connected to one and only one output phase, and no two input phases are connected to the same output phase. The aforementioned constraints ensure that there is no short between input phases and that all output phases are connected. There are twenty-seven combinations of the nine switch states that satisfy these constraints. A duty cycle factor can be associated with each switch. The nine duty cycle factors are adjusted such that the aforementioned switching constraints are always satisfied, and furthermore, the ratio of generator to grid voltage is regulated up to a maximum value and the grid-side displacement power factor is controlled. The generator-side voltage is chosen to regulate the rotor speed of the wind turbine.

Figure 4:
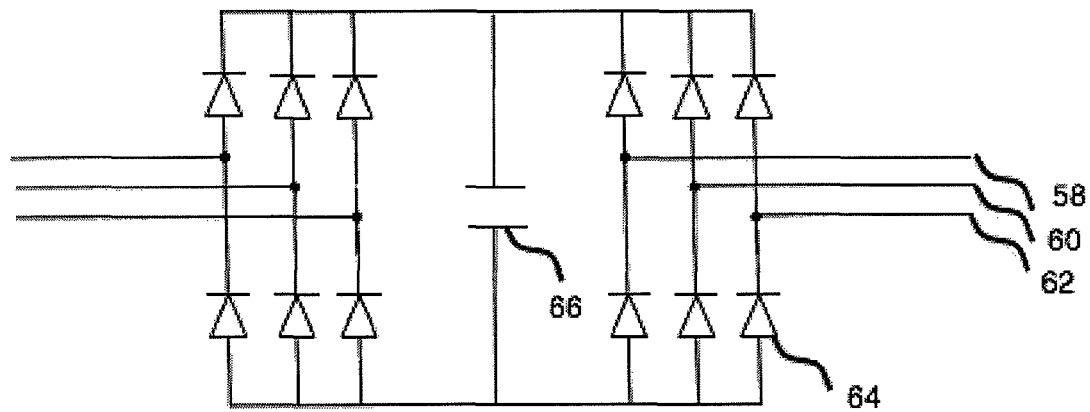
FIG. 4 shows a realization of the clamp circuit of the matrix converter in accordance with an embodiment of the present invention.

FIG. 4 is a circuit diagram showing the realization of a clamp circuit in an embodiment of the present invention. For a 3 phase to 3 phase matrix converter, the clamping circuit is realized using twelve fast recovery diodes 64 and a clamp capacitor 66. The input filter minimizes the high frequency components in the input currents and reduces the impact of perturbations of input power.

Figure 5:
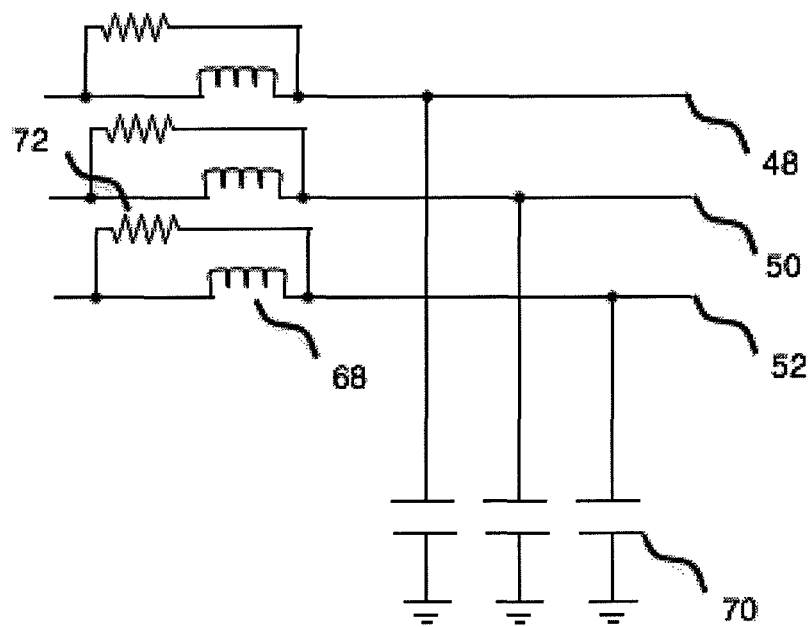
FIG. 5 shows a realization of an input filter of the matrix converter in accordance with an embodiment of the present invention.

FIG. 5 is a circuit diagram depicting an exemplary input filter using an inductor 68-capacitor 70 combination, with parallel damping resistor 72, in accordance with an embodiment of the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of controlling a wind energy conversion system (WECS), the method comprising an integrated control scheme repeating the following steps:

inputting by a controller data comprising the actual wind velocity measured by a wind sensor, the actual speed of a rotor as measured by a tachometer, rotor torque, generator speed, generator torque, effective gear feedback torque felt by the rotor, generator-side emf and current, grid-side emf and current, control gear ratio;

calculation by the controller of switching function control input to the matrix converter and control input to the generator for optimizing the efficiency of wind energy conversion by the WECS.

* * * * *